United States Patent Office 3,160,664
Patented Dec. 8, 1964

3,160,664
ACETYLENIC ω-HALOALKYLAMINES
Norman D. Dawson, Elkhart, Ind., assignor to Miles Laboratories, Inc., Elkhart, Ind., a corporation of Indiana
No Drawing. Filed Apr. 10, 1959, Ser. No. 805,369
14 Claims. (Cl. 260—570.5)

This invention relates to certain new chemical compounds and particularly to halogen-containing alkynyl alkylamines. More specifically, the invention pertains to N-substituted-N-alkynyl-ω-haloalkylamines represented by the following general formula:

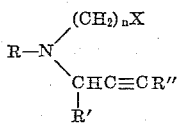

wherein R represents an alkyl group containing from 1 to 8 carbon atoms, halogenated lower alkyl groups, aryl or aralkyl groups; R', hydrogen, aryl, aralkyl or lower alkyl groups; $n$, the cardinal numbers 2 or 3; X, a halogen atom; and R'', hydrogen, lower alkyl or alkenyl groups or a group represented by the following formula:

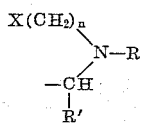

wherein R, R', $n$ and X have the same meanings ascribed to them above.

Briefly, the novel compositions of this invention are prepared by reacting a selected N-substituted-N-alkynyl-ω-amino-1-alkanol with the desired thionyl halide, phosphorus trihalide, or other suitable halogenating agents, in accordance with the following graphic equation:

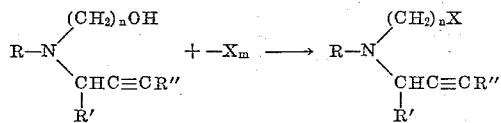

wherein R, R', R'', $n$ and X have the same meanings ascribed to them above, and $m$ is a small integer, preferably from 2 to 4.

In the preferred method of preparing the present compounds, the reaction materials and conditions for the above identified reactions are generally as follows:

The N-substituted-N-alkynyl-ω-amino-1-alkanols used as starting materials for the preparation of the new N-substituted-N-alkynyl-ω-haloalkylamines of the present invention can be prepared in accordance with the method described in co-pending applications of Willard J. Croxall, entitled "Acetylenically Unsaturated Ethanolamines and Process for Their Preparation," U.S. Serial No. 672,571, filed July 18, 1957, and "Acetylenically Unsaturated Aminopropanols and Process for Their Preparation," U.S. Serial No. 716,854, filed February 24, 1958, and assigned to the assignee of the present invention, both applications now abandoned.

The N-substituted-N-alkynyl-ω-amino-1-alkanol as well as the thionyl halide or phosphorus trihalide reactants are separately dissolved in a suitable solvent, such as chloroform, carbon tetrachloride, ethylene dichloride, and the like, which will not enter into the reaction, but which provide a reaction medium. Chloroform as inert solvent is especially preferred. The amount of the solvent used will depend to a certain extent upon the equipment used. Generally speaking, however, from about 2 to 5 parts of solvent per part of the thionyl halide are used. Where the diamine compound of Example X is desired, approximately 7 parts of solvent per part of the aminoethanol compound are employed.

The reactants, dissolved as described above, are then admixed by treating dropwise over a period of about 20 minutes the N-substituted-N-alkynyl-ω-amino-1-alkanol solution with the proper halide solution, while moderating or controlling the exothermic reaction by means of an ice bath, thereby achieving a temperature range of from 0° to 20° C. A more preferable temperature range is from 5° to 10° C. The resulting reaction mixture is then allowed to warm to room temperature, and is thereafter heated to 50° C. and refluxed for the period of time necessary to effect the completion of the substitution of the hydroxy radical by the halogen atom, usually about one hour.

The solvent and excess halide are then removed by stripping, and the residue, a dark viscous oil, is solidified by trituration with diethyl ether or other suitable material. Product purification is completed by methods known to the art, such as recrystallization, distillation, and the like.

The present compounds may be obtained as free bases having the formula given above or preferably, for pharmacological use, as non-toxic water-soluble addition salts of halogen acids, sulfuric acid, maleic acid, and the like. The hydrochlorides represent especially preferred embodiments.

The new compounds thus prepared have utility as physiologically active agents and more particularly as adrenergic blocking agents. Their ability to block the pressor effect of the adrenaline (epinephrine) makes them especially useful in the treatment of peripheral vascular diseases and neurogenic hypertension when used alone or in combination with milder hypotensive agents.

The following examples will illustrate the various types of compounds contemplated by the invention as defined by the above general formula and a procedure for their preparation:

EXAMPLE I

*N-Benzyl-N-2-Propynyl-2-Chloroethylamine Hydrochloride*

A solution of 37.8 g. of N-benzyl-N-2-propynyl-2-amino-1-ethanol in 50 ml. of chloroform was treated with an excess of ethereal hydrochloride. The ether was removed from the precipitated oil and was replaced by chloroform. The mixture was cooled, and a solution of 35.4 g. of thionyl chloride in 75 ml. of chloroform was added slowly. After the addition, the dark reaction mixture was allowed to come to room temperature and was then refluxed for one hour. The solvent and excess thionyl chloride were removed under reduced pressure to give a dark oil which crystallized when triturated with ether. After two crystallizations from methanol-ether the desired product, N-benzyl-N-2-propynyl-2-chloroethylamine hydrochloride, melting at 167–169° C., was obtained. The yield was 32.6 g. (67% of theory).

The following pharmacological data were obtained by preliminary screening tests:

The lethal dose 50 in mice for intraperitoneal administration, $LD_{50}$ (Mouse IP), of this compound was 164 mg./kg.

This compound exhibited adrenergic blocking action on excitatory, but not inhibitory, responses. Adrenaline (epinephrine) and noradrenaline (norepinephrine) induced contractions of isolated dog and rabbit blood vessels and isolated rabbit uterus were blocked by concentrations of this compound equal to or less than those of the contracting agents. Further increase in concentration caused reversal of the adrenaline effect (relaxation) in isolated blood vessels. Adrenaline and noradrenaline-induced relaxation of isolated rabbit jejunum was unaltered by concentrations of this compound in excess of those required to block the aforementioned contractile responses. In the anesthetized dog an intravenous dose equivalent to 5% of the $LD_{50}$ (Mouse IP) blocked and reversed the vasopressor response to intravenous adrenaline. The vasopressor responses to intravenous noradrenaline and to splanchnic (sympathetic) nerve stimulation were blocked also. Maximal blocking action occurred in twenty to thirty minutes and lasted in excess of three hours.

Further, this compound exhibited an inhibitory action on the gut. A concentration of 1 mcg./ml. caused relaxation of the isolated rabbit jejunum, inhibiting both tone and motility. In rats, an intraperitoneal dose equivalent to 10% of the $LD_{50}$ (Mouse IP) inhibited propulsive motility of the small intestine (charcoal meal) and delayed gastric emptying (barium meal).

Still further, this compound exhibited an oxytocic action, a concentration of 1 mcg./ml. causing contraction of the isolated rabbit uterus.

EXAMPLE II

*N-Isobutyl-N-2-Propynyl-2-Chloroethylamine Hydrochloride*

A solution of 18 g. of N-isobutyl-N-2-propynyl-2-amino-1-ethanol in 100 ml. of chloroform was treated dropwise with a solution of 23.8 g. of thionyl chloride dissolved in 20 ml. of chloroform. The reaction was moderated by the use of an ice bath. Following the addition of the thionyl chloride, the reaction mixture was allowed to warm to room temperature and was then refluxed gently for one hour. A solid residue was obtained when the solvent and excess thionyl chloride were removed by stripping. The crude material was purified by dissolving it in a minimum amount of boiling isopropanol and allowing the hydrochloride to separate from the slow cooling solution. A colorless product was obtained, melting at 134–136° C.

Pharmacological data and effects:

The $LD_{50}$ (Mouse IP) of this compound was 171 mg./kg. It exhibited adrenergic blocking action. In the anesthetized dog an intravenous dose equivalent to 5% of the $LD_{50}$ (Mouse IP) partially blocked the vasopressor response to intravenous adrenaline. It also partially blocked pupillary dilatation elicited by central vagosympathetic (superior cervical sympathetic preganglionic) nerve stimulation. Maximal blocking action occurred in ten to thirty minutes and lasted in excess of one hour.

This compound also exhibited cholinergic blocking action. In the aforementioned anesthetized dog the vasodepressor responses to intravenous acetylcholine and to peripheral vagosympathetic (cardiac vagal) nerve stimulation were partially blocked. Maximal blocking action occurred in ten to thirty minutes, the effect on acetylcholine lasting fifteen to forty minutes and that to cardiac vagal stimulation lasting in excess of an hour.

EXAMPLE III

*N-t-Octyl-N-2-Propynyl-2-Chloroethylamine Hydrochloride*

A solution of 25 g. of N-t-octyl-N-2-propynyl-2-amino-1-ethanol in 100 ml. of chloroform was treated dropwise over 20 minutes with a solution of 23.5 g. of thionyl chloride in 30 ml. of chloroform. The reaction mixture was controlled by the use of an ice bath. Following the addition, the mixture was allowed to warm to room temperature and was then heated at gentle reflux for one hour. The mixture was stripped of excess thionyl chloride and solvent to give a red-brown oil which solidified when triturated with diethyl ether. The compound was recrystallized three times from a mixture of isopropanol and ether to give a colorless product melting at 140–142° C.

EXAMPLE IV

*N-Isopropyl-N-(1-n-Propyl-2-Propynyl)-2-Chloroethylamine Hydrochloride*

A quantity of 35.5 g. of N-isopropyl-N-(1-n-propyl-2-propynyl)-2-amino-1-ethanol was disssolved in 100 ml. of chloroform and the externally-cooled solution treated dropwise with 35.4 g. of thionyl chloride. The solution was allowed to come to room temperature and then gently refluxed for two hours. The excess thionyl chloride and chloroform were stripped from the reaction mixture leaving a viscous, purple oil. After dissolving the oil in water, the solution was made basic and the oil which separated was extracted with benzene. The combined benzene extracts were stripped of benzene and the residual oil distilled in vacuo. A colorless oil was collected at 108–110° C./6 mm. The oil was dissolved in ether and the solution treated with ethereal hydrochloride. After recrystallization from isopropanol-ether, the colorless solid melted at 120–122° C.

Pharmacological data and effects:

The $LD_{50}$ (Mouse IP) of this compound was 76 mg./kg. It exhibited adrenergic blocking action. In the anesthetized dog an intravenous dose equivalent to 5% of the $LD_{50}$ (Mouse IP) blocked and reversed the vasopressor response to intravenous adrenaline. Maximal blocking action occured within one hour and lasted in excess of one hour.

Further, this compound also exhibited some cholinergic blocking action. In the aforementioned anesthetized dog the vasodepressor response to peripheral vagosympathetic (cardiac vagal) nerve stimulation was partially blocked. Maximal blocking action occurred within one hour and lasted in excess of one hour.

EXAMPLE V

*N-Benzyl-N-(1-Benzyl-2-Propynyl)-2-Chloroethylamine Hydrochloride*

A solution of 44.5 g. of N-benzyl-N-(1-benzyl-2-propynyl)-2-amino-1-ethanol in 150 ml. of chloroform was treated dropwise with a solution of 33 g. of thionyl chloride dissolved in 50 ml. of chloroform. The reaction was moderated by the use of an ice bath. Subsequent to the addition, the reaction mixture was allowed to warm to room temperature followed by a heating period of one hour at 50° C. The reaction mixture was cooled and then stripped to give a viscous oil which was taken up in hot methanol and then treated with diethyl ether to incipient crystallization. The fine crystalline product thus obtained was washed with ethyl ether and air dried. The product melted at 202–204° C. The product was further purified by dissolving it in a minimum amount of boiling isopropanol, and allowing the compound to crystallize from the slow cooling solution. The compound crystallized in the form of shining plates. The melting point was 199–201° C. when taken in a capillary tube. The higher melting point (202–204° C.) was obtained on the Fisher block.

EXAMPLE VI

*N-Benzyl-N-(1-n-Propyl-2-Propynyl)-2-Chloroethylamine Hydrochloride*

A solution of 30 g. of N-benzyl-N-(1-n-propyl-2-propynyl)-2-amino-1-ethanol in 150 ml. of chloroform was treated dropwise with a solution of 24 g. of thionyl chloride dissolved in 50 ml. of chloroform at 5–10° C. After the addition was completed, the reaction mixture was allowed to come to room temperature and then warmed at 50° C. for one hour. The reaction mixture stood at room temperature overnight. The solvent and excess thionyl chloride were stripped under reduced pressure to give a dark oil which solidified. The solid was dissolved in ethanol and treated with Darco three times to give a colorless solution which deposited light tan crystals. The product was dissolved in a minimum amount of hot isopropanol and ether added to the point of crystallization.

The colorless material obtained by the latter crystallization melted at 146–148° C.

Pharmacological data and effects:

The $LD_{50}$ (Mouse IP) of this compound was 219 mg./kg. It exhibited adrenergic blocking action. In the anesthetized dog an intravenous dose equivalent to 5% of the $LD_{50}$ (Mouse IP) blocked and reversed the vasopressor response to intravenous adrenaline. It also blocked pupillary dilatation elicited by central vagosympathetic (superior cervical sympathetic preganglionic) nerve stimulation. Maximal blocking action occurred in ten to thirty-five minutes and lasted in excess of one hour.

EXAMPLE VII

*N-Isopropyl-N-2-Butynyl-2-Chloroethylamine Hydrochloride*

A solution of 31 g. of N-isopropyl-N-2-butynyl-2-amino-1-ethanol in 100 ml. of chloroform was treated dropwise with a solution of 30 g. of thionyl chloride and 30 ml. of chloroform. Subsequent to the addition the ice bath was removed, the mixture allowed to warm to room temperature and then refluxed for one hour. The residue which remained after stripping the thionyl chloride and chloroform solidified when it was triturated with diethyl ether. In order to effect purification it was necessary to dissolve the hydrochloride in water, giving it a treatment with Darco and then concentration of the colorless filtrate to dryness. The solid could then be readily crystallized from isopropanol and ether. The colorless compound melted at 141–142° C.

Pharmacological data and effects:

The $LD_{50}$ (Mouse IP) of this compound was 59 mg./kg. It exhibited adrenergic blocking action. In the anesthetized dog an intravenous dose equivalent to 5% of the $LD_{50}$ (Mouse IP) partially blocked the vasopressor response to intravenous adrenaline. Maximal blocking action occurred in thirty-five minutes and lasted in excess of one hour.

EXAMPLE VIII

*N-Isopropyl-N-(4-Methyl-4-Penten-2-Ynyl)-2-Chloroethylamine Hydrochloride*

A solution of 30 g. of N-isopropyl-N-(4-methyl-4-penten-2-ynyl)-2-amino-1-ethanol in 100 ml. of chloroform was treated dropwise with a solution of 26 g. of thionyl chloride in 30 ml. of chloroform. The reaction was moderated by using an ice bath. The mixture was allowed to warm to room temperature after the addition, and was then heated for one hour at 40–50° C. The residual, dark oil which remained after stripping the excess reactant and solvent solidified when scratched with ethyl ether. After three recrystallizations from ethyl acetate the colorless material melted sharply at 95–96° C.

Pharmacological data and effects:

The $LD_{50}$ (Mouse IP) of this compound was 82 mg./kg. It exhibited adrenergic blocking action. In the anesthetized dog an intravenous dose equivalent to 5% of the $LD_{50}$ (Mouse IP) partially blocked the vasopressor response to intravenous adrenaline. Maximal blocking action occurred in thirty minutes and lasted in excess of two hours.

This compound exhibited striking cholinergic blocking action. Acetylcholine-induced contraction of isolated guinea pig ileum was blocked by this compound at a concentration sixty-four times less than that of acetylcholine. In the aforementioned anesthetized dog the vasodepressor responses to intravenous acetylcholine and to peripheral vagosympathetic (cardiac vagal) nerve stimulation were blocked. Maximal blocking action occurred in five minutes and lasted in excess of two hours. Mydriasis and failure of the pupil to constrict to light were noted also. These effects were produced when this compound was instilled in the eye of an unanesthetized dog in a concentration as low as 0.1%.

This compound produced a sustained vasodepressor (hypotensive) effect in the anesthetized dog.

EXAMPLE IX

*N-2-Propynyl-N-Bis-2-Chloroethylamine Hydrochloride*

A solution of 35 g. of 2-propynyl-2-aminodiethanol in 100 ml. of chloroform was treated with a solution of 60 g. of thionyl chloride in 50 ml. of chloroform. The exothermic reaction was controlled by an ice bath, and during the addition a white solid separated from the reaction mixture. Following the addition the mixture was allowed to warm to room temperature and then refluxed for one hour. A yellow solid remained after stripping the solvent. The yellow solid was dissolved in the minimum amount of water, the solution was treated with Darco and the colorless crystals, melting at 125–127° C. were allowed to separate from the cooled, concentrated aqueous solution.

Pharmacological data and effects:

The $LD_{50}$ (Mouse IP) of this compound was 219 mg./kg. It exhibited ardenergic action. In the anesthetized dog an intravenous dose equivalent to 5% of the $LD_{50}$ (Mouse IP) blocked and reversed the vasopressor response to intravenous adrenaline. Maximal blocking action occurred in ten minutes and lasted in excess of one hour.

The compound also exhibited some cholinergic blocking action. In the aforementioned anesthetized dog the vasodepressor response to peripheral vagosympathetic (cardiac vagal) nerve stimulation was partially blocked. Maximal blocking action occurred in ten minutes and lasted in excess of one hour.

EXAMPLE X

*2-Butynyl-1,4-Bis-(N-Benzyl-N-2-Chloroethylamine) Dihydrochloride*

Seventy-two grams of 2-butynyl-1,4-bis-(N-benzyl-N-2-amino-1-ethanol) in 500 ml. of chloroform was treated in the cold with 48 g. of thionyl chloride. The solution was refluxed for two hours. The chloroform and excess thionyl chloride was removed under reduced pressure leaving a solid residue which melted at 215–217° C. Two recrystallizations from methanolethyl acetate gave colorless needles melting at 224–225° C.

EXAMPLE XI

*N-Benzyl-N-2-Propynyl-3-Chloropropylamine*

A solution of 57 g. (0.28 mole) of N-benzyl-N-2-propynyl-3-amino-1-propanol in 100 ml. of chloroform was treated dropwise with a solution of 41.7 g. (0.35 mole) of thionyl chloride dissolved in 50 ml. of chloroform. No cooling bath was used. An exothermic reaction took place and the yellow solution gradually became brown. Following the addition of $SOCl_2$, the reaction mixture was refluxed for one hour. After stripping the solvent an almost glassy residue was obtained which resisted efforts of being crystallized. The solid was dissolved in water, the solution was made basic and the oil which separated was extracted into benzene which was then filtered and stripped. The residue, after distillation in vacuo, yielded 50.0 g. (80.5%) of a colorless oil with a boiling point of 125° C./0.05 mm.

EXAMPLE XII

*N-Benzyl-N-(1-n-Propyl-2-propynyl)-3-Chloropropylamine*

A solution of 49 g. (0.2 mole) of N-benzyl-N-(1-n-propyl-2-propynyl)-3-amino-1-propanol in 200 ml. of chloroform was stirred and cooled while a solution of the thionyl chloride (29.3 g. —0.25 mole) in 50 ml. of chloroform was dropped in over a period of one hour. This reaction mixture was allowed to warm to room temperature within a ½ hour period and was then refluxed for 1½ hours. The mixture was then again cooled and the solvent was removed by distillation at reduced pressure. A viscous black mass remained. This material solidified upon trituration with ethyl acetate. The solid was collected and washed with ethyl ether and then dissolved in hot isopropanol. Four volumes of ethyl were added to the solution, which was cooled in an ice bath for one hour. The desired compound was then collected, washed with ethyl ether and dried in an oven. It weighed 23.5 g. (39.2% yield) and had a M.P. of 116.5–119° C.

EXAMPLE XIII

*N-Isobutyl-N-2-Heptynyl-3-Chloropropylamine*

Thirty grams (0.133 mole) of N-isobutyl-N-2-heptynyl-3-amino-1-propanol were dissolved in 100 ml. of chloroform. The solution was stirred, the flask surrounded by an ice bath and a solution of the thionyl chloride (19 g.—0.16 mole) in 50 ml. of chloroform dropped in slowly over a period of 1½ hours. The reaction mixture remained a light yellow. The ice bath was removed and the mixture allowed to rise slowly to room temperature. Gas began to evolve and the temperature rose. Stirring was discontinued and the mixture allowed to stand overnight. Reaction mixture had turned to reddish-brown overnight. Stirring was started and the mixture brought to reflux. It was refluxed for 1½ hours, cooled and stripped of solvent at reduced pressure. As the remaining dark oil would not crystallize, it was made basic. Then the oil in ethyl ether was washed with water and with brine and dried over sodium sulfate. The ether was stripped from the solution and the residue distilled in vacuo. The bright yellow oil distilled at 126–128° C./1.4 mm. The yield was 24.7 g. (76.5%).

Pharmaceutical compositions which have utility as adrenergic blocking agents are conveniently and easily produced by combining a compound of the class hereinbefore described with fillers, carriers, extenders and/or excipients, such as are generally used in the preparation of pharmaceutical products which are to be taken orally or given parenterally. The compounds may be used in the form of the free base or of the salts of acids which are water-soluble and non-toxic, such as the hydrochloride, hydrobromide, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salts, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water-soluble salts, may be associated with such carriers as water, saline solution, glucose solution and the like.

We have found that for oral administration a suitable dosage unit is from about 50 to 300 milligrams of the compound per tablet, capsule or other dosage form. Where the material is to be administered parenterally, then a suitable dosage unit would be from about 35 to 300 milligrams of the active ingredient.

Dosages as above described may be administered as frequently as conditions demand as those skilled in the art will appreciate.

The following examples will illustrate in detail typical procedures for preparing a number of representative dosage unit forms of our compositions in accordance with this invention.

EXAMPLE XIV

A pharmaceutical composition having the following formulation was prepared:

| | Mg. |
|---|---|
| N-isobutyl-N-2-propynyl-2-chloroethylamine hydrochloride | 50.0 |
| Lactose | 200.0 |
| Magnesium stearate | 5.0 |

The acetylenic haloalkylamine is mixed with the lactose and thoroughly wetted with water. The wetted material is then pressed through a sieve of the desired size and dried in an oven at about 140° F. When dry, the magnesium stearate is added, and the composition is dry-mixed thoroughly. The mixed material is then compressed into tablets.

It will be understood that the above example is only representative of one specific form of this invention. Other excipients such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid, and the like are operable.

For best results from about 2 to 10 parts by weight of the lubricant is used. It will be understood that any of the haloalkylamines described above may be used as the active ingredient of the composition. Depending on the dosage unit desired, from 50 to 300 parts of the desired compound will be used.

EXAMPLE XV

For capsules the following formulation was used:

| | Mg. |
|---|---|
| N-isobutyl-N-2-propynyl-2-chloroethylamine hydrochloride | 500.0 |
| Lactose | 1000.0 |
| Talc | 75.0 |

This material was prepared as described in Example XIV above, that is, the chloroethylamine and the lactose were wetted, sieved, dried, and mixed with the talc. Capsules each containing 50 mg. of the active ingredient were prepared.

To summarize briefly, this invention relates to N-substituted-N-alkynyl-ω-haloalkylamines of the formula:

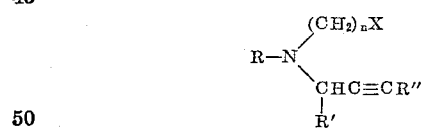

wherein R represents alkyl groups containing not more than 8 carbon atoms halogenated lower alkyl groups, aryl or aralkyl groups; R′, hydrogen, aryl, aralkyl or lower alkyl groups; n, the cardinal numbers 2 or 3; X, halogen; and R″, hydrogen, lower alkyl or alkenyl groups or a group represented by the following formula:

wherein R, R′, n and X have the same meanings ascribed to them above.

In the formulae above, R is preferably lower alkyl groups, such as isomers of butyl or propyl, a lower aralkyl group, such as benzyl, or a chloroethyl group; R′, hydrogen or a lower alkyl group such as propyl; R″, hydrogen or a methyl or methyl ethenyl group; and X is preferably chlorine.

This application is a continuation-in-part of my copending application, Serial No. 718,427, filed March 3, 1958, and entitled: "Hydrohalides of N-Substituted-N-Alkynyl-2-Haloethylamines," now abandoned.

What is claimed is:
1. N-substituted-N-alkynyl-ω-haloalkylamines of the formula:

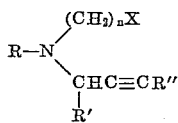

wherein R is a member of the class consisting of alkyl radicals containing not more than 8 carbon atoms, lower haloalkyl radicals, phenyl and benzyl radicals; R' is a member of the class consisting of hydrogen, phenyl, benzyl and lower alkyl radicals; $n$ is an integer from 2 to 3 inclusive; X is a halogen atom; and R" is a member of the class consisting of hydrogen, lower alkyl radicals, alkenyl radicals having not more than 3 carbon atoms and a radical represented by the formula:

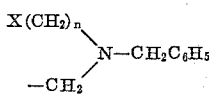

wherein $n$ and X are defined above.

2. N-benzyl-N-(1-benzyl-2-propynyl) - 2 - chloroethylamine.
3. 2-butynyl-1,4-bis-(N-benzyl-N-2-chloroethylamine).
4. N-benzyl-N-2-propynyl-3-chloropropylamine.
5. N-benzyl-N-(1-n-propyl-2-propynyl)-3-chloropropylamine.
6. N-benzyl-N-(1-n-propyl-2-propynyl)-2 - chloroethylamine.
7. N-benzyl-N-2-propynyl-2-chloroethylamine.
8. N-isopropyl-N-(4-methyl-4-penten-2-ynyl)-2-chloroethylamine.
9. N-2-propynyl-N-bis-2-chloroethylamine.
10. N-isobutyl-N-2-heptynyl-3-chloropropylamine.
11. N-t-octyl-N-2-propynyl-2-chloroethylamine.
12. N-isopropyl-N-(1-n-propyl-2-propynyl) - 2 - chloroethylamine.
13. N-isopropyl-N-2-butynyl-2-chloroethylamine.
14. N-isobutyl-N-2-propynyl-2-chloroethylamine.

References Cited in the file of this patent
UNITED STATES PATENTS

| | | |
|---|---|---|
| Re. 24,826 | Biel | May 17, 1960 |
| 2,573,605 | Rieveschl et al. | Oct. 30, 1951 |
| 2,665,311 | McKeever et al. | Jan. 5, 1954 |
| 2,749,275 | Borsook | June 5, 1956 |
| 2,890,984 | Sahyun | June 16, 1959 |
| 2,897,236 | Moss | July 28, 1959 |

FOREIGN PATENTS

| | | |
|---|---|---|
| 510,904 | Great Britain | Aug. 10, 1939 |
| 1,024,773 | Germany | Feb. 20, 1958 |